United States Patent
Lee et al.

(10) Patent No.: US 12,040,721 B2
(45) Date of Patent: Jul. 16, 2024

(54) BIDIRECTIONAL VOLTAGE CONVERTER AND OPERATION METHOD THEREOF

(71) Applicant: Lite-On Singapore Pte Ltd, Singapore (SG)

(72) Inventors: Jon Karlo Lee, Singapore (SG); Joey De Guzman, Singapore (SG)

(73) Assignee: Lite-On Singapore Pte Ltd, Singapore (SG)

( * ) Notice: Subject to any disclaimer, the term of this patent is extended or adjusted under 35 U.S.C. 154(b) by 248 days.

(21) Appl. No.: 17/719,347

(22) Filed: Apr. 12, 2022

(65) Prior Publication Data

US 2023/0327566 A1   Oct. 12, 2023

(51) Int. Cl.
*H02M 3/335*   (2006.01)
*H02M 1/00*   (2006.01)

(52) U.S. Cl.
CPC ..... *H02M 3/33584* (2013.01); *H02M 1/0009* (2021.05)

(58) Field of Classification Search
CPC ........... H02M 1/0009; H02M 3/33569; H02M 3/33584

USPC .......................................................... 363/17
See application file for complete search history.

(56) References Cited

U.S. PATENT DOCUMENTS

| 9,812,977 | B2* | 11/2017 | Ye | H02M 3/33592 |
| 2015/0244279 | A1* | 8/2015 | Takagi | H02M 3/33584 363/17 |
| 2020/0136521 | A1* | 4/2020 | Lin | H02M 3/33573 |

* cited by examiner

*Primary Examiner* — Yemane Mehari
(74) *Attorney, Agent, or Firm* — JCIPRNET

(57) ABSTRACT

A bidirectional voltage converter that includes a transformer, a first bridge circuit, a second bridge circuit and a controller is introduced. The first bridge circuit is coupled to a first side of the transformer and a first voltage source, and the first bridge circuit comprises a first switch, a second switch, a third switch and a fourth switch. The second bridge circuit is coupled to a second side of the transformer and a second voltage source. The controller is configured to set the first bridge circuit to a half-bridge configuration by turning off the third switch, turning on the fourth switch, and alternately turning on and off the first switch and the second switch in response to determining that a voltage of the second voltage source is less than a predetermined threshold. An operation method of the bidirectional voltage converter is also introduced.

7 Claims, 8 Drawing Sheets

BIDIRECTIONAL VOLTAGE CONVERTER AND OPERATION METHOD THEREOF

BACKGROUND

Technical Field

The disclosure relates to a voltage converter, and more particularly to a bidirectional voltage converter and an operation method of a bidirectional voltage converter that are capable of improving a voltage gain of the bidirectional voltage converter and expanding an operational voltage range of the bidirectional voltage converter.

Description of Related Art

A bidirectional voltage converter is used in a variety of electronic devices such as electric vehicles, energy storage systems, mobile phones, computers and the like. The bidirectional voltage converter is designed to convert a first voltage to a second voltage in a first operation mode and to convert the second voltage to the first voltage in a second operation mode. However, the voltage gain of the existing bidirectional voltage converter is not satisfactory, and the operational voltage range of the existing bidirectional voltage converter can be improved.

With higher demand for high performance bidirectional voltage converters, there is a need for a new design which improves the voltage gain and the operational voltage range of the bidirectional voltage converter.

SUMMARY

The disclosure introduces a bidirectional voltage converter and an operation method thereof that are capable of improving the voltage gain of the bidirectional voltage converter and expanding the operational voltage range of the bidirectional voltage converter.

In some embodiments, the bidirectional voltage converter includes a transformer, a first bridge circuit, a second bridge circuit and a controller. The first bridge circuit which is coupled to a first side of the transformer and a first voltage source comprises a first switch, a second switch, a third switch and a fourth switch. A first terminal of the first switch and a first terminal of the third switch are coupled to a first terminal of the first voltage source. A second terminal of the first switch is coupled to a first connection node, a first terminal of the second switch is coupled to the first connection node, a second terminal of the third switch is coupled to a second connection node, a first terminal of the fourth switch is coupled to the second connection node, a first terminal of the first side of the transformer is coupled to the first connection node, and a second terminal of the first side of the transformer is coupled to the second connection node, a second terminal of the second switch and a second terminal of the fourth switch are coupled to a second terminal of the first voltage source. The second bridge circuit is coupled to the second side of the transformer and coupled to a second voltage source. The controller is coupled to the first bridge circuit and the second bridge circuit, and the controller is configured to set the first bridge circuit to a half-bridge configuration by turning off the third switch, turning on the fourth switch, and alternately turning on and off the first switch and the second switch in response to determining that a voltage of the second voltage source is less than a predetermined threshold.

In some embodiments, the operation method is adapted to the bidirectional voltage converter that comprises a transformer, a first bridge circuit and a second bridge circuit. The transformer comprises a first side and a second side, wherein the first bridge circuit is coupled to the first side of the transformer and coupled to a first voltage source. The first bridge circuit comprises a first switch, a second switch, a third switch and a fourth switch, wherein a first terminal of the first switch and a first terminal of the third switch are coupled to a first terminal of the first voltage source, a second terminal of the first switch is coupled to a first connection node, a first terminal of the second switch is coupled to the first connection node, a second terminal of the third switch is coupled to a second connection node, a first terminal of the fourth switch is coupled to the second connection node, a first terminal of the first side of the transformer is coupled to the first connection node, and a second terminal of the first side of the transformer is coupled to the second connection node, a second terminal of the second switch and a second terminal of the fourth switch are coupled to a second terminal of the first voltage source. The second bridge circuit is coupled to the second side of the transformer and coupled to a second voltage source. The operation method includes steps of determining whether a voltage of the second voltage source is less than a predetermined threshold, and setting the first bridge circuit to a half-bridge configuration and setting the second bridge circuit to a full-bridge configuration in response to determining that the voltage of the second voltage source is less than the predetermined threshold.

According to embodiments of the disclosure, when the voltage of a voltage source (i.e., battery) is less than the predetermined threshold, the first bridge circuit is set to the half-bridge configuration and the second bridge circuit is set to the full-bridge configuration. In some embodiments, when the voltage of the voltage source is greater than or equal to the predetermined threshold, both the first bridge circuit and the second bridge circuit are set to the full-bridge configuration. In this way, the voltage gain of the bidirectional voltage converter is improved, and the operational voltage range of the bidirectional voltage converter is expanded.

DESCRIPTION OF THE EMBODIMENTS

Figure 1:
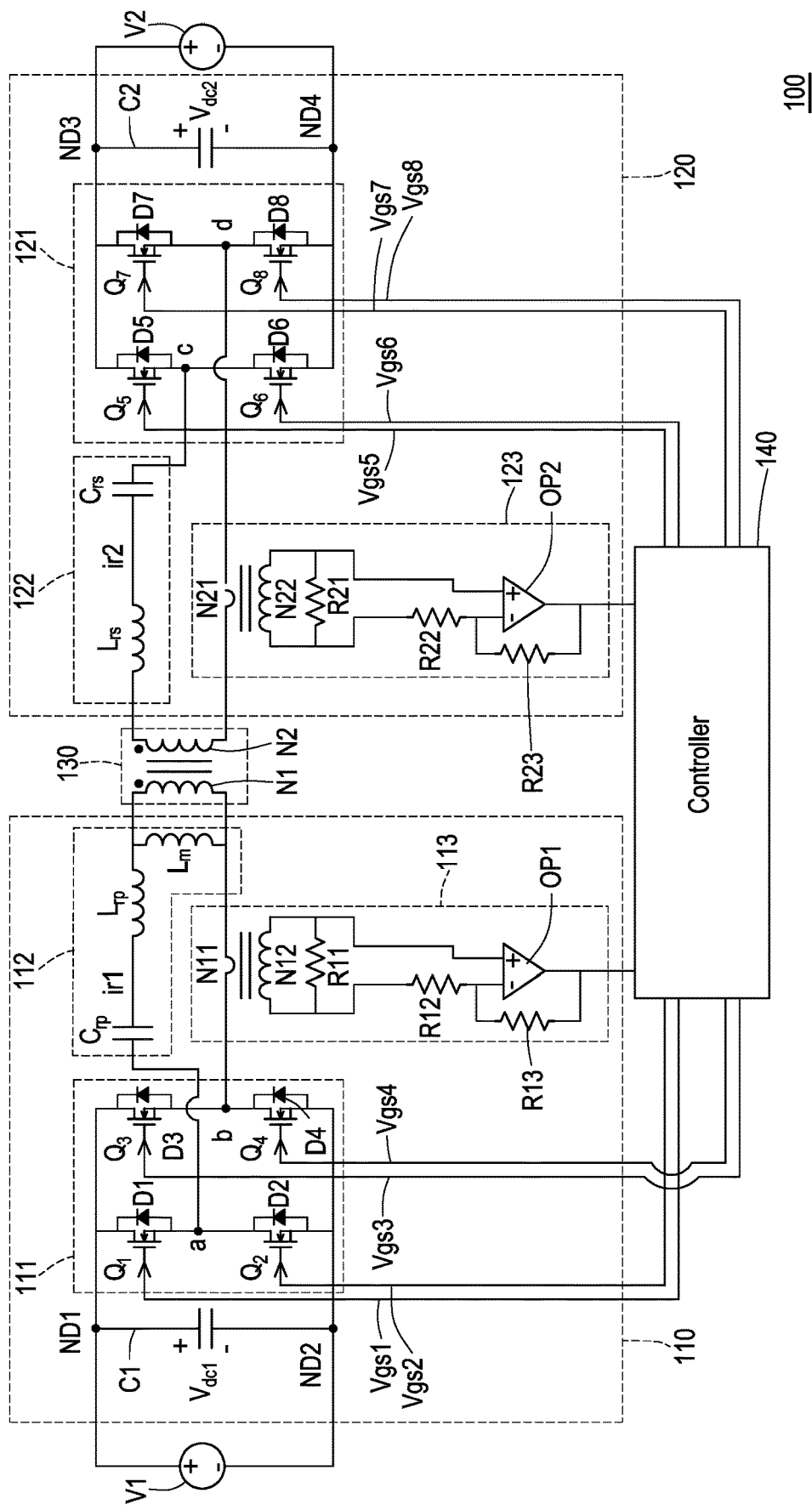
FIG. 1 illustrates a bidirectional voltage converter in accordance with some embodiments.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic diagram of a bidirectional voltage converter 100 in accordance with some embodiments. The bidirectional voltage converter 100 may include a first-side circuitry 110, a second-side circuitry 120, a transformer 130 and a controller 140. The transformer 130 may include windings N1 and N2 located at a first side and a second side of the transformer 130, respectively. In a first operation mode of the bidirectional voltage converter 100, the winding N1 serves as the primary winding of the transformer 130, the winding N2 serves as the secondary winding of the transformer 130, the first side of the transformer 130 serves as a primary side of the transformer 130, and the second side of the transformer 130 serves as a secondary side the transformer 130. In a second operation mode of the bidirectional voltage converter 100, the winding N1 serves as the secondary winding of the transformer 130, the winding N2 serves as the primary winding of the transformer 130, the first side of the transformer 130 servers as the secondary side of the transformer 130, and the second side of the transformer 130 servers as the primary side of the transformer 130. It is noted that the primary side of the transformer 130 refers to the side where power or voltage is inputted, and the secondary side of the transformer 130 refers to the side where power or voltage is outputted. The first operation mode may be referred to as a forward operation mode, and the second operation mode may be referred to as a reverse operation mode. A structure and an operation of a transformer are well known in the related art, thus the detailed description about the structure and the operation of the transformer 130 is omitted hereafter.

In some embodiments, the first-side circuitry 110 includes a capacitor C1 coupled between nodes ND1 and ND2, and the first-side circuitry 110 is coupled to a first voltage source V1 through the nodes ND1 and ND2. A voltage Vdc1 between the nodes ND1 and ND2 serves as the input voltage of the bidirectional voltage converter 100 in the first operation mode, and the voltage Vdc1 serves as the output voltage of the bidirectional voltage converter 100 in the second operation mode. The first-side circuitry 110 is further coupled to the controller 140 and the winding N1 of the transformer 130. The first-side circuitry 110 may further include a first bridge circuit 111, a first resonant circuit 112 and a first current sensing circuit 113. The first bridge circuit 111 may include a first switch Q1, a second switch Q2, a third switch Q3, and a fourth switch Q4, in which the first switch Q1 is coupled to the second switch Q2 through a first connection node a, and the third switch Q3 is coupled to the fourth switch Q4 through a second connection node b. A first terminal of the first switch Q1 and a first terminal of the third switch Q3 are coupled to the node ND1 which is electrically coupled to a first terminal of the first voltage source V1. A second terminal of the second switch Q2 and a second terminal of the fourth switch Q4 are coupled to the node ND2 which is electrically coupled to a second terminal of the first voltage source V1. A second terminal of the first switch Q1 is coupled to a first terminal of the second switch Q2 through the first connection node a. A second terminal of the third switch Q3 is coupled to a first terminal of the fourth switch Q4 through the second connection node b. A first terminal of the first side of the transformer 130 is coupled to the first connection node a, and a second terminal of the first side of the transformer 130 is coupled to the second connection node b.

The first bridge circuit 111 may further include a plurality of diodes D1, D2, D3, and D4 corresponding to the switches Q1, Q2, Q3, and Q4. In some embodiments, each of the switches Q1, Q2, Q3, and Q4 is coupled in parallel to a corresponding one of the diodes D1, D2, D3, and D4. For example, the switch Q1 is coupled in parallel to the diode D1, and the switch Q4 is coupled in parallel to the diode D4. In some embodiments, the switches Q1, Q2, Q3, and Q4 are transistors, in which the drain and source terminals of each of the transistors Q1, Q2, Q3, and Q4 is coupled to the anode and cathode terminals of the corresponding one of the diodes D1, D2, D3, and D4. In these embodiments, the gate terminals of the transistors Q1, Q2, Q3, and Q4 are coupled to the controller 140 to receive gate control signals Vgs1, Vgs2, Vgs3, and Vgs4 outputted by the controller 140. The controller 140 may set the first bridge circuit 111 to different configurations such as full-bridge (FB) configuration or a half-bridge (HB) configuration through the gate control signals Vgs1, Vgs2, Vgs3, and Vgs4. The detailed description about FB and HB configurations will be described in association with FIGS. 3A to 3D. In some embodiments, the switches Q1, Q2, Q3, and Q4 are metal oxide semiconductor field effect transistors (MOSFETs), but the disclosure does not intend to limit the switches Q1, Q2, Q3, and Q4 to any particular types or designs.

In some embodiments, the first resonant circuit 112 is coupled between the first bridge circuit 111 and the transformer 130. The first resonant circuit 112 may include a first capacitor Crp and a first inductor Lrp that is coupled to the first capacitor Crp in series. The first inductor Lrp may be electrically coupled to the first terminal of the first side of the transformer 130. For example, the first inductor Lrp may be electrically coupled to the winding N1 of the transformer 130. In some embodiments, the first resonant circuit 112 may further include an auxiliary inductor Lm which is coupled to the first inductor Lrp in series. The auxiliary inductor Lm may be coupled in parallel to the winding N1 of the transformer 130. In other words, a first terminal of the auxiliary inductor Lm is coupled to the first terminal of the first side of the transformer 130, and a second terminal of the auxiliary inductor Lm is coupled to the second terminal of the first side of the transformer 130. It is noted that the first resonant circuit 112 may include more or less elements than those illustrated in FIG. 1 according to designed needs. The first resonant circuit 112 is configured to circulate a first current ir1 flowing through the first resonant circuit 112 in accordance with a switching frequency of the switches Q1, Q2, Q3, and Q4 in the first bridge circuit 111. In this way, the energy is circulated and delivered from the primary side of the transformer 130 to the secondary side of the transformer 130. In some embodiments, the switching frequency of the switches Q1, Q2, Q3, and Q4 is controlled by the gate control signals Vgs1, Vgs2, Vgs3, and Vgs4 outputted by the controller 140.

The first current sensing circuit 113 is configured to sense the first current ir1 flowing through the first resonant circuit 112 (i.e., the current flowing through the inductor Lrp of the first resonant circuit 112). The first current sensing circuit 113 may include a current transformer and an operational amplifier circuit, in which the current transformer is formed by windings N11, N12 and the resistor R11, and the operational amplifier circuit is formed by resistors R12, R13 and an operational amplifier OP1. The first current sensing circuit 113 is coupled to the controller 140, and is configured to send the sensed value of the first current ir1 to the controller 140.

In some embodiments, the second-side circuitry 120 includes a capacitor C2 coupled between nodes ND3 and ND4, and the second-side circuitry 120 is coupled to a second voltage source V2 through the nodes ND3 and ND4. A voltage Vdc2 between the nodes ND3 and ND4 serves as the output voltage of the bidirectional voltage converter 100 in the first operation mode, and the voltage Vdc2 serves as the input voltage of the bidirectional voltage converter 100 in the second operation mode. The second-side circuitry 120 may further couple to the controller 140 and the winding N2 of the transformer 130. The second voltage source V2 may be a battery, and the voltage Vdc2 may also be referred to as a battery voltage.

In some embodiments, the second-side circuitry 120 may further include a second bridge circuit 121, a second resonant circuit 122 and a second current sensing circuit 123. The second bridge circuit 121 is coupled to the second side of the transformer 130 and to the second voltage source V2. The second bridge circuit 121 may include a fifth switch Q5, a sixth switch Q6, a seventh switch Q7, and an eighth switch Q8, in which the fifth switch Q5 is coupled to the sixth switch Q6 through a third connection node c, and the seventh switch Q7 is coupled to the eighth switch Q8 through a fourth connection node d. A first terminal of the fifth switch Q5 and a first terminal of the seventh switch Q7 are coupled to the node ND3 which is electrically coupled to a first terminal of the second voltage source V2. A second terminal of the sixth switch Q6 and a second terminal of the eighth switch Q8 are coupled to node ND4 which is electrically coupled to a second terminal of the first voltage source V2. A second terminal of the fifth switch Q5 is coupled to a first terminal of the sixth switch Q6 through the third connection node c. A second terminal of the seventh switch Q7 is coupled to a first terminal of the eighth switch Q8 through the fourth connection node d. A first terminal of the second side of the transformer 130 is coupled to the third connection node c, and a second terminal of the second side of the transformer 130 is coupled to the fourth connection node d. The second bridge circuit 121 may further include a plurality of diodes D5, D6, D7, and D8 corresponding to the fifth switch Q5, the sixth switch Q6, the seventh switch Q7, and the eighth switch Q8, where each of the switches Q5, Q6, Q7, and Q8 is coupled in parallel to a corresponding one of the diodes D5, D6, D7, and D8. In some embodiments, the fifth switch Q5, the sixth switch Q6, the seventh switch Q7, and the eighth switch Q8 are transistors (i.e., MOSFETs), in which the drain and source terminals of each of the transistors Q5, Q6, Q7, and Q8 is coupled to the anode and cathode terminals of the corresponding one of the diodes D5, D6, D7, and D8. The gate terminals of the transistors Q5, Q6, Q7, and Q8 are coupled to the controller 140 to receive gate control signals Vgs5, Vgs6, Vgs7, and Vgs8 outputted by the controller 140. The controller 140 may set the second bridge circuit 121 to different configurations such as the FB configuration or the HB configuration through the gate control signals Vgs5, Vgs6, Vgs7, and Vgs8. The detailed description about FB and HB configurations will be described in association with FIGS. 3A to 3D.

In some embodiments, the second resonant circuit 122 is coupled between the second bridge circuit 121 and the transformer 130. The second resonant circuit 122 may include a second capacitor Crs and a second inductor Lrs, in which the second capacitor Crs is coupled to the third connection node c, the second inductor Lrs is coupled in series to the second capacitor Crs and coupled to the first terminal of the second side of the transformer 130. The second resonant circuit 122 is configured to circulate a second current ir2 flowing through the second resonant circuit 122 in accordance with the switching frequency of the switches in the second bridge circuit 121. In some embodiments, the switching frequency for switching the first switch Q1, the second switch Q2, the third switch Q3, and the fourth switch Q4 in the first bridge circuit 111 is synchronous to the switching frequency for switching the fifth switch Q5, the sixth switch Q6, the seventh switch Q7, and the eighth switch Q8 in the second bridge circuit 121.

The second current sensing circuit 123 is configured to sense the second current ir2 flowing through the second resonant circuit 122 (i.e., the current flowing through the second inductor Lrs of the second resonant circuit 122). The second current sensing circuit 123 may include a current transformer and an operational amplifier circuit, in which the current transformer is formed by windings N21, N22 and the resistor R21, and the operational amplifier circuit is formed by resistors R22, R23 and an operational amplifier OP2. The second current sensing circuit 123 is coupled to the controller 140, and is configured to send the sensed value of the second current ir2 to the controller 140.

In some embodiments, the controller 140 is coupled to the first current sensing circuit 113 and the second current sensing circuit 123, and is configured to output gate control signals Vgs1, Vgs2, Vgs3, Vgs4, Vgs5, Vgs6, Vgs7, and Vgs8 for controlling the switches Q1, Q2, Q3, Q4, Q5, Q6, Q7, and Q8. In some embodiments, the controller 140 is configured to control operations of the switches Q1, Q2, Q3, Q4, Q5, Q6, Q7, and Q8 according to the sensed values of the first current ir1 and the second current ir2. It is noted that the disclosure does not intend to limit the structure of the controller 140.

In some embodiments, the controller 140 is configured to set the first bridge circuit 111 and the second bridge circuit 121 to different configurations. For example, the controller 140 may set the first bridge circuit 111 and the second bridge circuit 121 to the FB operation mode by alternately turning on and off the first switch Q1, the second switch Q2, the third switch Q3, the fourth switch Q4, the fifth switch Q5, the sixth switch Q6, the seventh switch Q7, and the eighth switch Q8. The controller 140 may set the first bridge circuit 111 to the HB configuration by turning off the third switch Q3, turning on the fourth switch Q4, and alternately turning on and off the first switch Q1 and the second switch Q2. In some embodiments, the controller 140 is configured to set the configurations of the first bridge circuit 111 and/or the second bridge circuit 121 according to a voltage of the second voltage source V2. For example, the controller 140 may set the first bridge circuit 111 to the HB configuration in response to determining that a voltage of the second voltage source V2 is less than a predetermined threshold. In addition, the controller 140 may set the first bridge circuit 111 to the FB configuration in response to determining that the voltage of the second voltage source V2 is greater than or equal to than the predetermined threshold.

Figure 2:
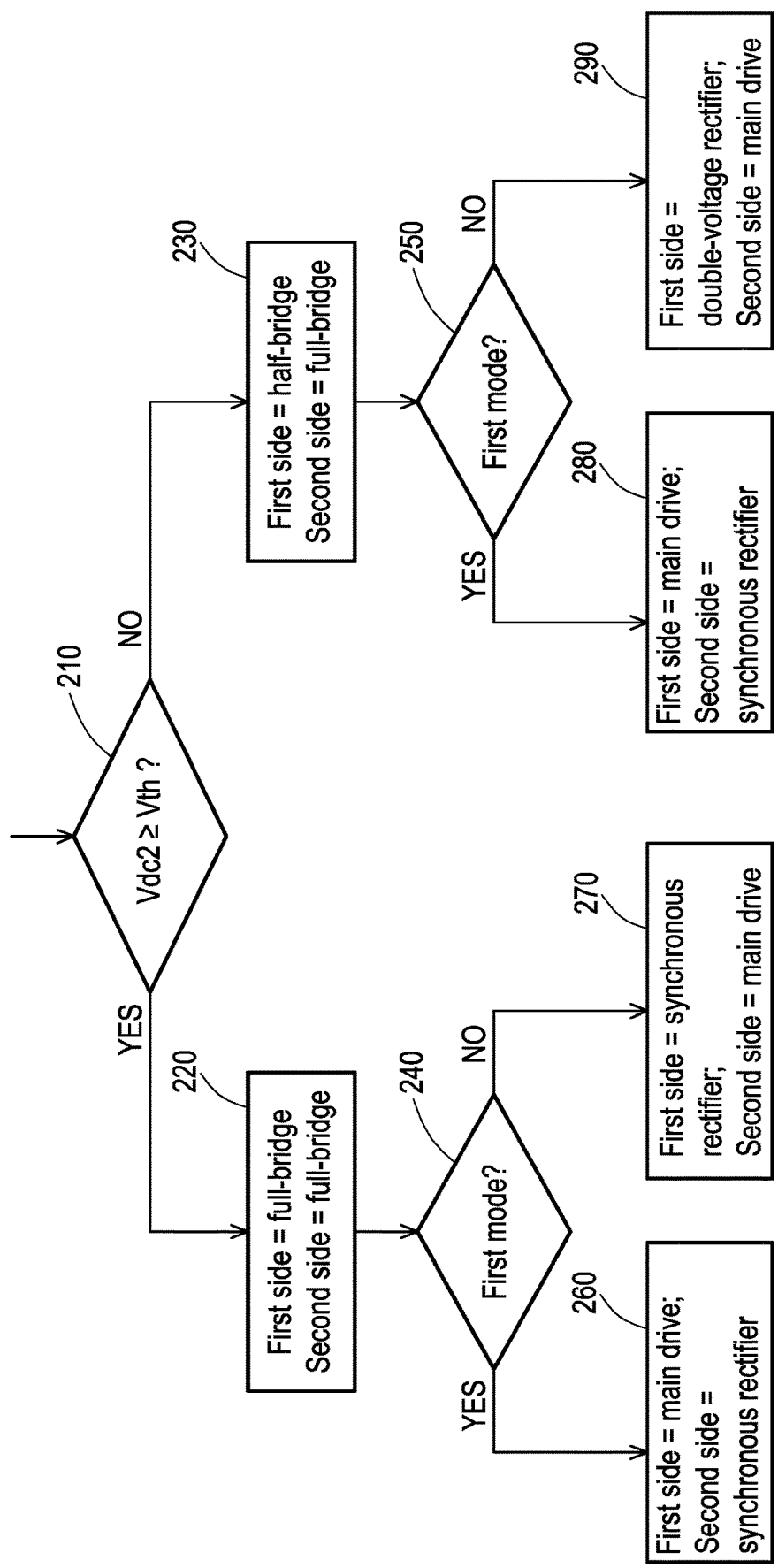
FIG. 2 illustrates a flowchart diagram of a method for configuring bridge circuits of the bidirectional voltage converter in accordance with some embodiments.

FIG. 2 illustrates a flowchart diagram of a method for configuring the first bridge circuit 111 and the second bridge circuit 121 of a bidirectional voltage converter 100 in accordance with some embodiments. In step 210, the method determines whether the voltage Vdc2 of the second voltage source V2 (i.e., battery voltage) is greater than or equal to a predetermined threshold Vth. When the voltage Vdc2 is greater than or equal to the predetermined threshold Vth (i.e., high battery voltage range), the first bridge circuit 111 and the second bridge circuit 121 are set to the FB configuration (step 220). In some embodiments, the first bridge circuit 111 and the second bridge circuit 121 are set to the FB configuration by alternately turning on and off the switches Q1, Q2, Q3, Q4, Q5, Q6, Q7, and Q8 in the first bridge circuit 111 and the second bridge circuit 121.

In step 240, the method determines whether the bidirectional voltage converter 100 is operating in the first operation mode (i.e., forward operation mode). If the bidirectional voltage converter 100 operates in the first operation mode, the first bridge circuit 111 is set as a main drive circuit of the transformer 130, and the second bridge circuit 121 is set as a synchronous rectifier of the transformer 130 (step 260 in FIG. 2). If the bidirectional voltage converter 100 does not operate in the first operation mode, the first bridge circuit 111 is set as the synchronous rectifier of the transformer 130, and the second bridge circuit 121 is set as the main drive circuit of the transformer 130 (step 270 in FIG. 2). In step 270, the bidirectional voltage converter 100 operates in the second operation mode (i.e., reverse operation mode).

Returning to step 210, when the voltage Vdc2 is less than the predetermined threshold Vth (i.e., low battery voltage range), the first bridge circuit 111 is set to the HB configuration and the second bridge circuit 121 is set to the FB configuration (step 230). In some embodiments, the first bridge circuit 111 may be set to the HB configuration by turning off the third switch Q3, turning on the fourth switch Q4, and alternately turning on and off the first switch Q1 and the second switch Q2. The second bridge circuit 121 is set to the FB configuration by alternately turning on and off the fifth switch Q5, the sixth switch Q6, the seventh switch Q7, and the eighth switch Q8. After step 230, the method proceeds to step 250.

In step 250, the method determines whether the bidirectional voltage converter 100 operates in the first operation mode. When the bidirectional voltage converter 100 operates in the first operation mode, the first bridge circuit 111 is set as the main drive circuit of the transformer 130, and the second bridge circuit 121 is set as the synchronous rectifier of the transformer 130 (step 280). Otherwise, when the bidirectional voltage converter 100 does not operate in the first operation mode, the first bridge circuit 111 is set as a double voltage rectifier (DVR) of the transformer 130, and the second bridge circuit 121 is set as the main drive circuit of the transformer 130 (step 290). Description of DVR is provided along with description of FIG. 3C.

Figure 3A:
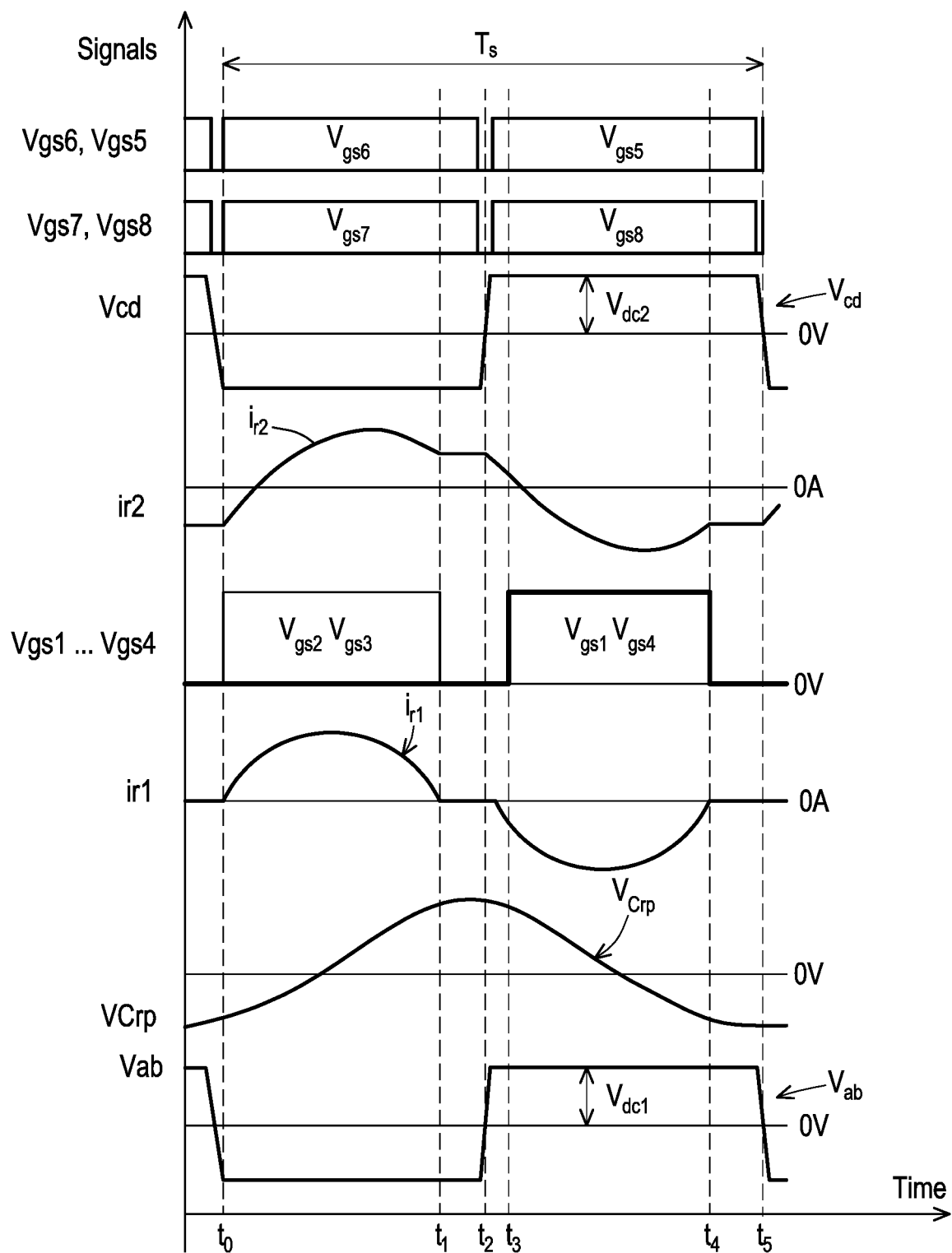
FIG. 3A illustrates a timing diagram of signals of a bidirectional voltage converter operating at a high voltage range in a second operation mode of the bidirectional voltage converter in accordance with some embodiments.

FIG. 3A illustrates a timing diagram of signals of the bidirectional voltage converter 100 operating at a high voltage range of the voltage Vdc2 in a second operation mode in accordance with some embodiments. When the bidirectional voltage converter 100 operates in the second operation mode, the voltage Vdc2 serves as the input voltage of the bidirectional voltage converter 100 and the voltage Vdc1 serves as the output voltage of the bidirectional voltage converter 100. In addition, the high voltage range refers to the condition where the voltage Vdc2 is greater than or equal to the predetermined threshold Vth (i.e., step 210, YES). When the voltage Vdc2 is in the high battery voltage range, the first bridge circuit 111 and the second bridge circuit 121 are set to the FB configuration (i.e., step 220).

Refer to FIG. 1, FIG. 3A and a switching cycle Ts illustrated in FIG. 3A. During a period from time t0 to time t2, the gate control signals Vgs6 and Vgs7 are configured to turn on the sixth switch Q6 and the seventh switch Q7, and the gate control signals Vgs5 and Vgs8 are configured to turn off the fifth switch Q5 and the eighth switch Q8. Thus, during the period from time t0 to time t2, the second current ir2 flows through the sixth switch Q6 and the seventh switch Q7. During a period from time t2 to time t5, the gate control signals Vgs5 and Vgs8 are configured to turn on the fifth switch Q5 and the eighth switch Q8, and the gate control signals Vgs6 and Vgs7 are configured to turn off the sixth switch Q6 and the seventh switch Q7. Thus, during the period from time t2 to time t5, the second current ir2 flows through the fifth switch Q5 and the eighth switch Q8. In this way, the controller may set the second bridge circuit 121 to the FB configuration by alternately turning on and off the fifth switch Q5, the sixth switch Q6, the seventh switch Q7 and the eighth switch Q8. As a result, a voltage Vcd is formed between the third connection node c and the fourth connection node d of the second bridge circuit 121.

The transformer 130 transforms energy from the second-side circuitry 120 to the first-side circuit 110, resulting in the voltage Vcrp accumulated in the first capacitor Crp, the voltage Vab between the first connection node a and the second connection node b of the first bridge circuit 111, and the first current ir1 flowing through the secondary side of the transformer 130. The first current ir1 is a positive current in a period from time t0 to time t1 and is a negative current in a period from time t3 to time t4. An amplitude of the positive current is greater than 0 ampere, and an amplitude of the negative current is less than 0 ampere. During a period from time t0 to time t1, the gate control signals Vgs2 and Vgs3 are configured to turn on the second switch Q2 and the third switch Q3, and the gate control signals Vgs1 and Vgs4 are configured to turn off the first switch Q1 and the fourth switch Q4. Thus, during the period from time t0 to time t1, the first current ir1 flows through the second switch Q2 and the third switch Q3, and the first current ir1 is the positive current. During a period from time t3 to time t4, the gate control signals Vgs1 and Vgs4 are configured to turn on the first switch Q1 and the fourth switch Q4, and the gate control signals Vgs2 and Vgs3 are configured to turn off the second switch Q2 and the third switch Q3. Thus, during the period from time t3 to time t4, the first current ir1 flows through the first switch Q1 and the fourth switch Q4, and the first current ir1 is the negative current. In this way, the controller may set the first bridge circuit 111 to the FB configuration by alternately turning on and off the first switch Q1, the second switch Q2, the third switch Q3 and the fourth switch Q4. In this way, the bidirectional voltage converter 100 may convert the voltage Vdc2 to the voltage Vdc1 in in the second operation mode when both the first bridge circuit 111 and the second bridge circuit 121 are set to the FB configuration. The voltage level of the output voltage Vdc1 is (N1/N2) *Vdc2.

Figure 3B:
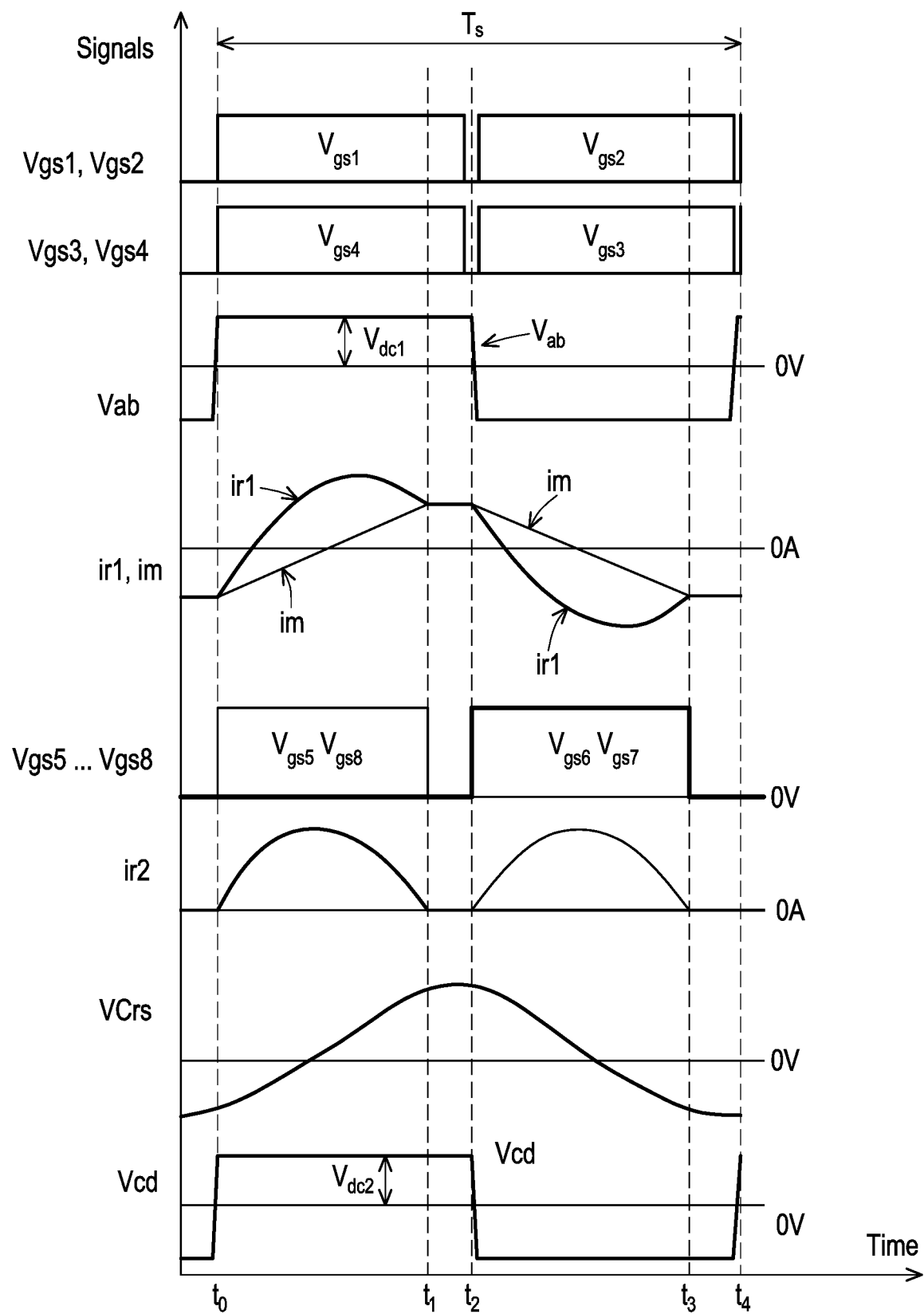
FIG. 3B illustrates a timing diagram of signals of a bidirectional voltage converter operating at a high voltage range in a first operation mode of the bidirectional voltage converter in accordance with some embodiments.

FIG. 3B illustrates a timing diagram of signals of the bidirectional voltage converter 100 operating at a high voltage range of the voltage Vdc2 in a first operation mode in accordance with some embodiments. When the bidirectional voltage converter 100 operates in the first operation mode, the voltage Vdc1 serves as the input voltage of the bidirectional voltage converter 100 and the voltage Vdc2 serves as the output voltage of the bidirectional voltage converter 100. When the voltage Vdc2 is in the high voltage range (i.e., step 210, YES), the first bridge circuit 111 and the second bridge circuit 121 are set to the FB configurations (i.e., step 220).

Refer to FIG. 1, FIG. 3B and a switching cycle Ts illustrated in FIG. 3B. During a period from time t0 to time t2, the gate control signals Vgs1 and Vgs4 are configured to turn on the first switch Q1 and the fourth switch Q4, and the gate control signals Vgs2 and Vgs3 are configured to turn off the second switch Q2 and the third switch Q3. During a period from time t2 to time t4, the gate control signals Vgs2 and Vgs3 are configured to turn on the second switch Q2 and the third switch Q3, and the gate control signals Vgs1 and Vgs4 are configured to turn off the first switch Q1 and the fourth switch Q4. In this way, the controller may set the first bridge circuit 111 to the FB configuration by alternately turning on and off the first switch Q1, the second switch Q2, the third switch Q3 and the fourth switch Q4. As a result, a voltage Vab is formed between the first connection node a and the second connection node b of the first bridge circuit 111, and the first current ir1 and current im flow through the first-side circuitry 110.

The transformer 130 transforms energy from the first-side circuitry 110 to the second-side circuitry 120, resulting in the voltage VCrs accumulated in the second capacitor Crs, the voltage Vcd between the third connection node c and the fourth connection node d of the second bridge circuit 121, and the second current ir2 flowing through the secondary side of the transformer 130. During a period from time t0 to time t1, the gate control signals Vgs5 and Vgs8 are configured to turn on the fifth switch Q5 and the eighth switch Q8, and the gate control signals Vgs6 and Vgs7 are configured to turn off the sixth switch Q6 and the seventh switch Q7. Thus, during the period from time t0 to time t1, the second current ir2 flows through the fifth switch Q5 and the eighth switch Q8. During a period from time t2 to time t3, the gate control signals Vgs6 and Vgs7 are configured to turn on the sixth switch Q6 and the seventh switch Q7, and the gate control signals Vgs5 and Vgs8 are configured to turn off the fifth switch Q5 and the eighth switch Q8. Thus, during the period from time t2 to time t3, the second current ir2 flows through the sixth switch Q6 and the seventh switch Q7. In this way, the controller may set the second bridge circuit 121 to the FB configuration by alternately turning on and off the fifth switch Q5, the sixth switch Q6, the seventh switch Q7 and the eighth switch Q8. In this way, the bidirectional voltage converter 100 may convert the voltage Vdc1 to the voltage Vdc2 in the first operation mode when the first bridge circuit 111 and the second bridge circuit 121 are set to the FB configuration. The voltage level of the output voltage Vdc2 is (N2/N1)*Vdc1.

Figure 3C:
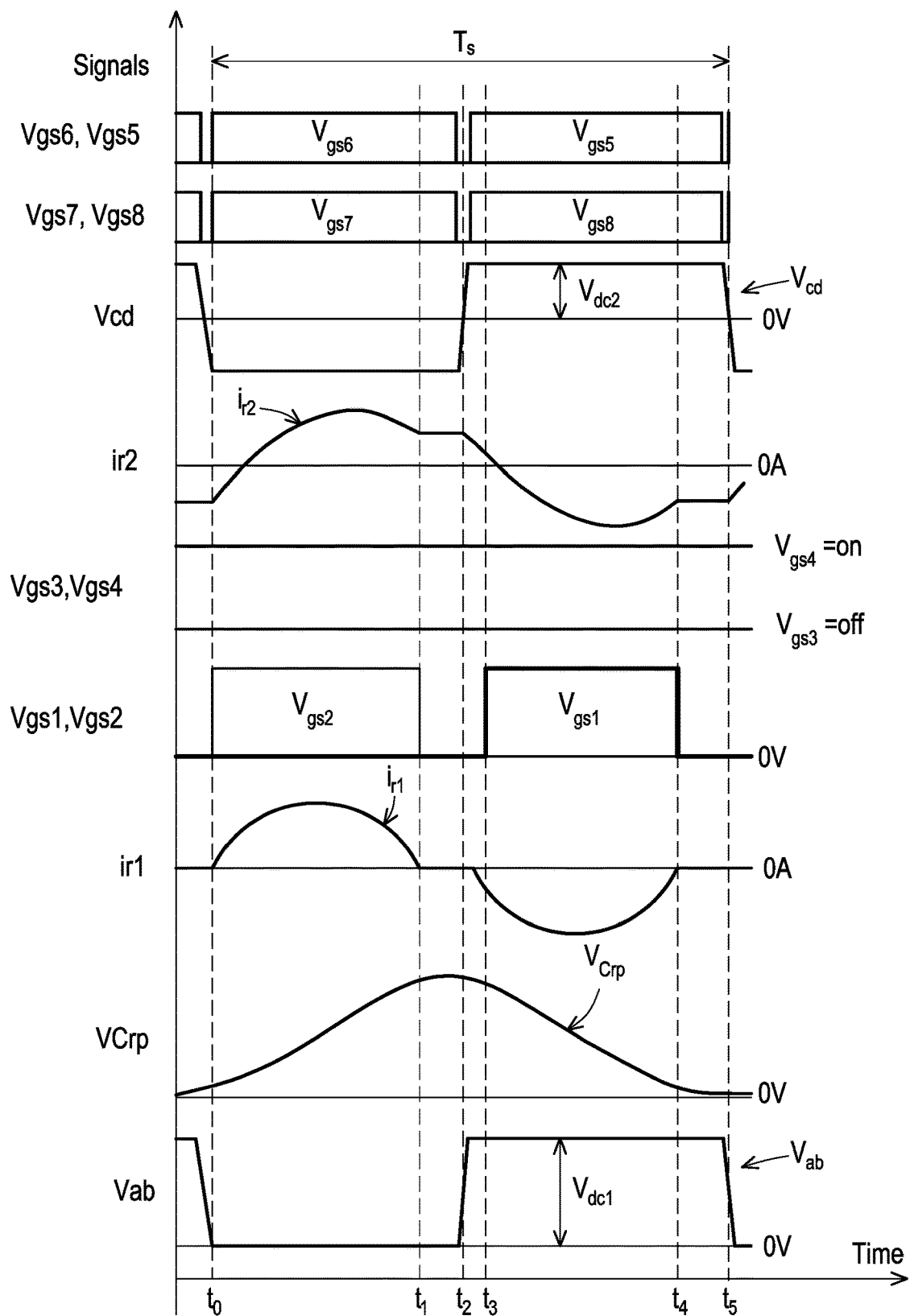
FIG. 3C illustrates a timing diagram of signals of a bidirectional voltage converter operating at a low voltage range in a second operation mode of the bidirectional voltage converter in accordance with some embodiments.

FIG. 3C illustrates a timing diagram of signals of the bidirectional voltage converter 100 operating at a low voltage range of the voltage Vdc2 in a second operation mode in accordance with some embodiments. Referring to FIG. 2 and FIG. 3C, when the bidirectional voltage converter 100 operates in the second operation mode with low voltage Vdc2, the voltage Vdc1 serves as the output voltage of the bidirectional voltage converter 100, the voltage Vdc2 serves as the input voltage of the bidirectional voltage converter 100, the first bridge circuit 111 is set to the HB configuration and the second bridge circuit 121 is set to the FB configuration. Since the second bridge circuit 121 is set to the FB configuration, the voltage Vcd between the third connection node c and the fourth connection node d of the second bridge circuit 121, the gate control signals Vgs5, Vgs6, Vgs7, and Vgs8, the first current ir1, and the second current ir2 in FIG. 3C are similar to the corresponding voltage, signals and current as shown in FIG. 3A.

A difference between the diagrams shown in FIG. 3A and FIG. 3C is the gate control signals Vgs1, Vgs2, Vgs3, and Vgs4. In FIG. 3C, since the first bridge circuit 111 is set to the HB configuration, the gate control signal Vgs3 is set to the low logic state (i.e., off state), and the gate control signal Vgs4 is set to the high logic state (i.e., on state). In other words, the fourth switch Q4 of the first bridge circuit 111 is always turned on and the third switch Q3 of the first bridge circuit 111 is always turned off when the first bridge circuit 111 is set to the HB configuration. When the first current ir1 is the positive current, the gate control signal Vgs2 is configured to turn on the second switch Q2, and the gate control signal Vgs1 is configured to turn off the first switch Q1. When the first current ir1 is the negative current, the gate control signal Vgs1 is configured to turn on the first switch Q1, and the gate control signal Vgs2 is configured to turn off the second switch Q2. As shown in FIG. 3C, the gate control signal Vgs2 has the high logic state to turn on the second switch Q2 during the period from t0 to t1, and the gate control signal Vgs1 has the high logic state to turn on the first switch Q1 during the period from t3 to t4. In this way, the controller may set the first bridge circuit 111 to the HB configuration by turning off the third switch Q3, turning on the fourth switch Q4, and alternately turning on and off the first switch Q1 and the second switch Q2.

Another difference between the diagrams shown in FIG. 3A and FIG. 3C is the waveform of the voltage Vcrp accumulated in the first capacitor Crp and the voltage Vdc1 outputted by the bidirectional voltage converter 100. When the first bridge circuit 111 is set to the HB configuration in the second operating mode of the bidirectional voltage converter 100, the first switch Q1, the second switch Q2, the third switch Q3, and the fourth switch Q4 are driven to charge and discharge the first capacitor Crp in such a way that a voltage level of the output voltage (i.e., Vdc1) of the bidirectional voltage converter 100 is double the voltage level of the output voltage obtained when the first bridge circuit 111 is set to the FB configuration. The voltage level of the output voltage Vdc1 when the first bridge circuit 111 is set to the FB configuration is (N1/N2)*Vdc2. The voltage level of the output voltage Vdc1 when the first bridge circuit 111 is set to the HB configuration is 2*(N1/N2)*Vdc2. In other words, the DVR is achieved by setting the first bridge circuit 111 to the HB configuration and by charging and discharging the first capacitor Crp appropriately using the gate control signals Vgs1, Vgs2, Vgs3, and Vgs4.

In FIG. 3C, during the period from t0 to t2, the second switch Q2, the fourth switch Q4, the sixth switch Q6 and the seventh switch Q7 are turned on, the first switch Q1 and the third switch Q3 are turned off, the direct-current (DC) voltage in the winding N1 is (N1/N2)*Vdc2. The voltage of the first capacitor Crp is the addition of the DC voltage (N1/N2)*Vdc2 and a time-varying voltage which resonates between the first capacitor Crp and the first inductor Lrp. Thus, this time-varying voltage is present at the first capacitor Crp and the first inductor Lrp. During the period from t0 to t2, since the first switch Q1 and the third switch Q3 are turned off, the output voltage Vdc1 does not change.

In FIG. 3C, during the period from t2 to t5, the first switch Q1, the fourth switch Q4, the fifth switch Q5 and the eighth switch Q8 are turned on, and the second switch Q2 and the third switch Q3 is turned off. The DC voltage in the winding N1 is (N1/N2)*Vdc2 but with opposite polarity. Thus, the voltage Vab is the addition of the DC voltage of the first capacitor Crp and the voltage in the winding N1: 2*(N1/

N2)*Vdc2. Time-varying voltages are present at the first capacitor Crp and the first inductor Lrp, and cancel each other. Since the first switch Q1 and the fourth switch Q4 are turned on, the output voltage Vdc1 is Vab, and the capacitor C1 charges to the voltage value 2*(N1/N2)*Vdc2.

Referring to FIG. 3A and FIG. 3C, when the bidirectional voltage converter 100 operates in the second operation mode, a voltage gain is determined according to a ratio between the output voltage (i.e., Vdc1) and the voltage of the second voltage source (i.e., Vdc2). In an embodiment, a first voltage gain obtained by setting the first bridge circuit 111 to the HB configuration in the second operation mode is higher than a second voltage gain obtained by setting the first bridge circuit 111 to the FB configuration in the second operation mode. In other words, when the bidirectional voltage converter 100 operates in the second operation mode, the HB configuration of the first bridge circuit 111 results in higher voltage gain at the low voltage range of the voltage Vdc2. In this way, the voltage gain of the bidirectional voltage converter 100 is improved and the operational voltage range of the bidirectional voltage converter 100 is expanded.

Figure 3D:
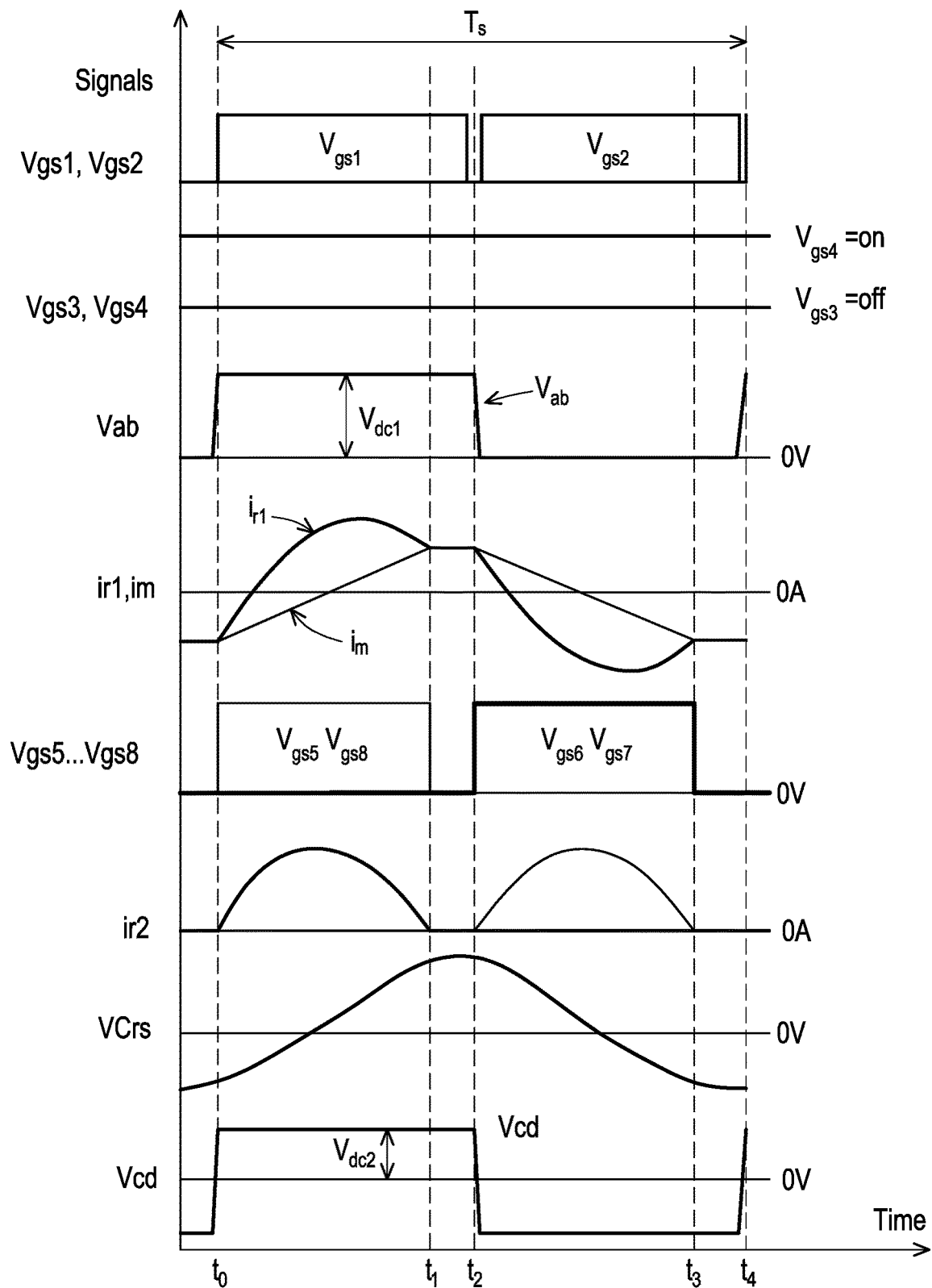
FIG. 3D illustrates a timing diagram of signals of a bidirectional voltage converter operating at a low voltage range in a first operation mode of the bidirectional voltage converter in accordance with some embodiments.

FIG. 3D illustrates a timing diagram of signals of the bidirectional voltage converter 100 operating at a low voltage range of the voltage Vdc2 in the first operation mode in accordance with some embodiments. When the bidirectional voltage converter 100 operates in the first operation mode with low voltage Vdc2, the voltage Vdc1 serves as the input voltage of the bidirectional voltage converter 100, the voltage Vdc2 serves as the output voltage of the bidirectional voltage converter 100, the first bridge circuit 111 is set to the HB configuration and the second bridge circuit 121 is set to the FB configuration. Since the second bridge circuit 121 is set to the FB configuration, the voltage Vcd between the third connection node c and the fourth connection node d of the second bridge circuit 121, the voltage VCrs of the second capacitor Crs, the gate control signals Vgs5, Vgs6, Vgs7, and Vgs8, and the first current ir1, the second current ir2, and the current im in FIG. 3D are similar to the corresponding voltages, signals and currents in FIG. 3B.

A difference between the diagrams shown in FIG. 3B and FIG. 3D is the gate control signals Vgs3 and Vgs4. In FIG. 3D, since the first bridge circuit 111 is set to the HB configuration, the gate control signals Vgs3 is set to the low logic state (i.e., off state) and the gate control signals Vgs4 is set to the high logic state (i.e., on state). In other words, the fourth switch Q4 of the first bridge circuit 111 is always turned on and the third switch Q3 of the first bridge circuit 111 is always turned off when the first bridge circuit 111 is set to the HB configuration. Since the first bridge circuit 111 is set to the HB configuration, the waveform of the voltage Vab between the first connection node a and the second connection node b of the first bridge circuit 111 in FIG. 3D is also different from the waveform of the voltage Vab in FIG. 3B. During the period from time t0 to t2, the gate control signal Vgs1 has the high logic state to turn on the first switch Q1, and the voltage Vab is the voltage level of input voltage Vdc1. During the period from time t2 to t4, the gate control signal Vgs2 has the high logic state to turn on the second switch Q2, and the voltage Vab is zero. In this way, the controller may set the first bridge circuit 111 to the HB configuration by turning off the third switch Q3, turning on the fourth switch Q4, and alternately turning on and off the first switch Q1 and the second switch Q2. The voltage level of the output voltage Vdc2 is 0.5*(N2/N1)*Vdc1.

Figure 4:
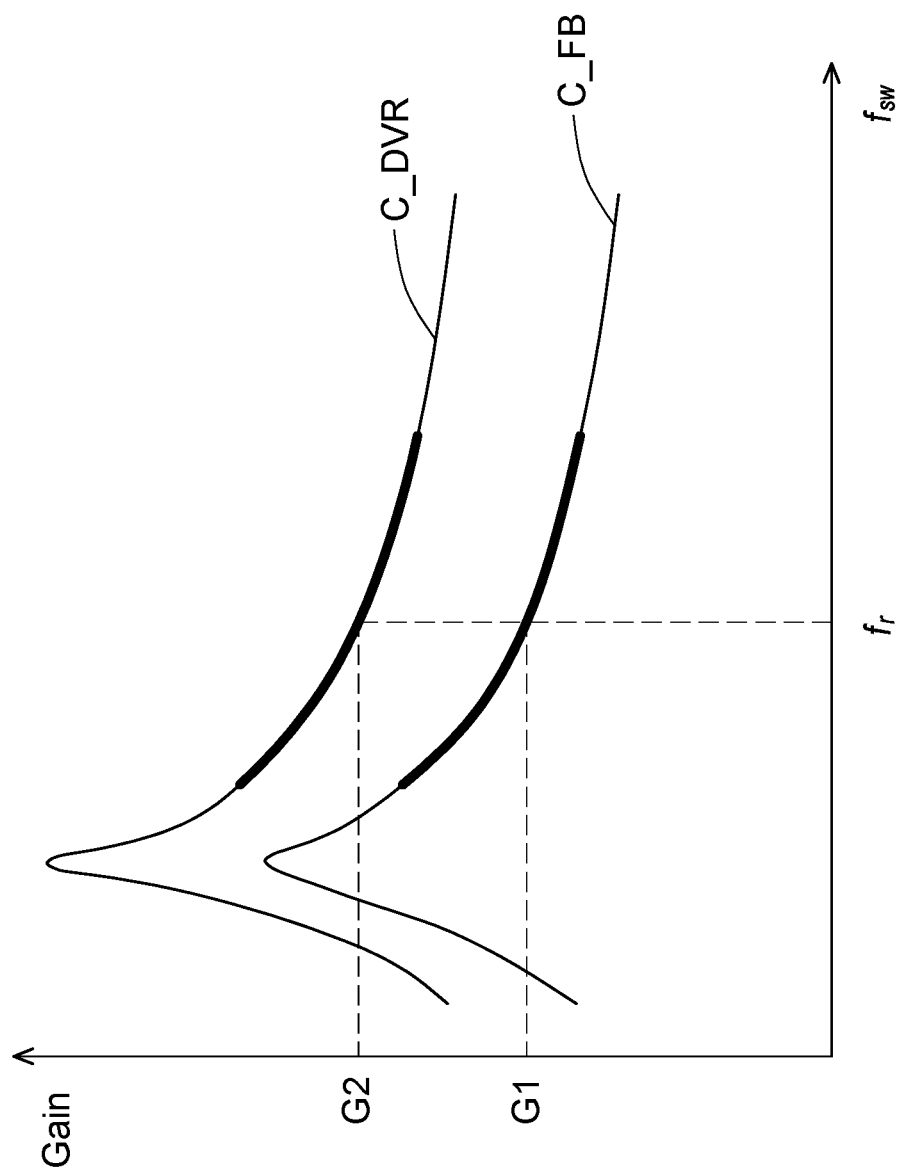
FIG. 4 illustrates exemplary operation curves of a bidirectional voltage converter in a second operation mode in accordance with some embodiments.

FIG. 4 illustrates exemplary operation curves C_DVR and C_FB of the bidirectional voltage converter 100 in the second operation mode in accordance with some embodiments. The vertical axis of the diagram illustrates the voltage gain of the bidirectional voltage converter 100, and the horizontal axis of the diagram illustrates the switching frequency fsw of the switches Q1, Q2, Q3, Q4, Q5, Q6, Q7, and Q8 of the bidirectional voltage converter 100. The operation curve C_DVR is obtained by setting the first bridge circuit 111 to the HB configuration at the low voltage range of the voltage Vdc2 in the second operation mode. The operation curve C_FB is obtained by setting the first bridge circuit 111 to the FB configuration at the high voltage range of the voltage Vdc2 in the second operation mode. As shown in FIG. 4, the operation curve C_DVR is always located above the operation curve C_FB for all the switching frequencies fsw. As an example, at the resonant switching frequency fr, the voltage gain of the DVR is G2 and the voltage gain of the FB configuration is G1, in which G2 is greater than G1. In other words, when the bidirectional voltage converter 100 operates in the second operation mode with low voltage range of the voltage Vdc2, setting the first bridge circuit 111 to the HB configuration results in higher voltage gain than setting the first bridge circuit 111 to the FB configuration.

Figure 5:
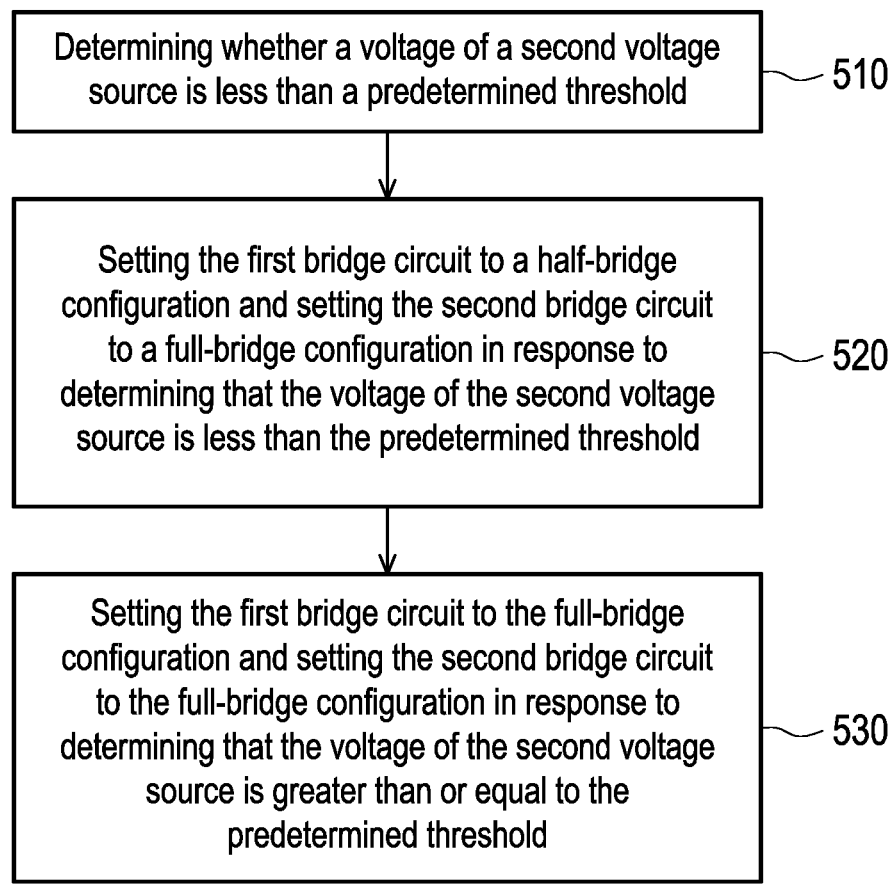
FIG. 5 illustrates a flowchart diagram of an operation method of the bidirectional voltage converter in accordance with some embodiments.

FIG. 5 is a flowchart diagram of an operation method of a bidirectional voltage converter 100 in accordance with some embodiments. In step 510, the operation method determines whether a voltage of a second voltage source is less than a predetermined threshold. In step 520, in response to determining that the voltage of the second voltage source is less than the predetermined threshold, the operation method sets the first bridge circuit to a half-bridge configuration and setting the second bridge circuit to a full-bridge configuration. In step 530, in response to determining that the voltage of the second voltage source is greater than or equal to the predetermined threshold, the operation method sets the first bridge circuit to the full-bridge configuration and setting the second bridge circuit to the full-bridge configuration.

In the foregoing embodiments, the configurations of the bridge circuits in the bidirectional voltage converter are set according to a voltage of a voltage source (i.e., second voltage source V2) and the operation mode (second operation mode or first operation mode) of the bidirectional voltage converter. When the voltage of the voltage source is less than the predetermined threshold, the first bridge circuit is set to the HB configuration and the second bridge circuit is set to the FB configuration. In some embodiments, when the voltage of the voltage source is greater than or equal to the predetermined threshold, both the first bridge circuit and the second bridge circuit are set to the FB configuration. In this way, the voltage gain of the bidirectional voltage converter is improved, and the operational voltage range bidirectional voltage converter is expanded.

Although the embodiment of the disclosure has been described in detail, the disclosure is not limited to a specific embodiment and various modifications and changes are possible within the scope of the disclosure disclosed in the claims.

What is claimed is:

1. A bidirectional voltage converter, comprising:
   a transformer, comprising a first side and a second side;
   a first bridge circuit, coupled to the first side of the transformer and coupled to a first voltage source, comprising a first switch, a second switch, a third switch and a fourth switch, wherein a first terminal of the first switch and a first terminal of the third switch are coupled to a first terminal of the first voltage source, a second terminal of the first switch is coupled to a first connection node, a first terminal of the second switch is coupled to the first connection node, a second terminal of the third switch is coupled to a second connection node, a first terminal of the fourth switch is coupled to the second connection node, a first terminal of the first side of the transformer is coupled to the first connection node, and a second terminal of the first side of the transformer is coupled to the second connection node, a second terminal of the second switch and a second terminal of the fourth switch are coupled to a second terminal of the first voltage source;

a second bridge circuit, coupled to the second side of the transformer and coupled to a second voltage source;

a controller, coupled to the first bridge circuit and the second bridge circuit; and a first resonant circuit, coupled between the first bridge circuit and the transformer, wherein the first resonant circuit comprises:
   a first capacitor, coupled to the first connection node; and
   a first inductor, coupled in series to the first capacitor, and coupled to the first terminal of the first side of the transformer, wherein the controller is configured to set the first bridge circuit to a half-bridge configuration by turning off the third switch, turning on the fourth switch, and alternately turning on and off the first switch and the second switch in response to determining that a voltage of the second voltage source is less than a predetermined threshold, the second bridge circuit comprises a fifth switch, a sixth switch, a seventh switch and an eighth switch, wherein a first terminal of the fifth switch and a first terminal of the seventh switch are coupled to a first terminal of the second voltage source, a second terminal of the fifth switch is coupled to a third connection node, a first terminal of the sixth switch is coupled to the third connection node, a second terminal of the seventh switch is coupled to a fourth connection node, a first terminal of the eighth switch is coupled to the fourth connection node, a first terminal of the second side of the transformer is coupled to the third connection node, a second terminal of the second side of the transformer is coupled to the fourth connection node, a second terminal of the sixth switch and a second terminal of the eighth switch are coupled to a second terminal of the second voltage source, the controller is further configured to set the second bridge circuit to the full-bridge configuration by alternately turning on and off the fifth switch, the sixth switch, the seventh switch and the eighth switch, the controller is further configured to set the first bridge circuit to the full-bridge configuration in response to determining that the voltage of the second voltage source is greater than or equal to the predetermined threshold, when the bidirectional voltage converter operates in a first operation mode, the first side of the transformer is a primary side of the transformer and the second side of the transformer is a secondary side of the transformer, the controller is further configured to set the first bridge circuit to drive a first input voltage to the first side of the transformer, the controller is further configured to set the second bridge circuit as a rectifier to provide a first output voltage, and wherein when the bidirectional voltage converter operates in a second operation mode, the second side of the transformer is the primary side of the transformer and the first side of the transformer is the secondary side of the transformer, the controller is further configured to set the second bridge circuit to drive a second input voltage to the second side of the transformer, the controller is further configured to set the first bridge circuit as a rectifier to provide a second output voltage, wherein when the controller configures the first bridge circuit to the full-bridge configuration and the bidirectional voltage converter operates in the second operation mode, a first voltage gain is the ratio between the second output voltage and the voltage of the second voltage source, wherein when the controller configures the first bridge circuit to the half-bridge configuration and the bidirectional voltage converter operates in the second operation mode, a second voltage gain is the ratio between the second output voltage and the voltage of the second voltage source, wherein the second voltage gain is greater than the first voltage gain.

2. The bidirectional voltage converter of claim 1, wherein the controller is configured to set the first bridge circuit to the full-bridge configuration in response to determining that the voltage of the second voltage source is greater than or equal to the predetermined threshold by alternately turning on and off the first switch, the second switch, the third switch and the fourth switch.

3. The bidirectional voltage converter of claim 2, further comprising
   a first current sensing circuit, sensing a first current flowing through the first resonant circuit,
   wherein when the controller sets the first bridge circuit to the full-bridge configuration by alternately turning on and off the first switch, the second switch, the third switch and the fourth switch, the controller alternately turns on and off the first switch, the second switch, the third switch and the fourth switch according to the first current,
   wherein when the controller sets the first bridge circuit to the half-bridge configuration by alternately turning on and off the first switch and the second switch, the controller alternately turns on and off the first switch and the second switch according to the first current.

4. The bidirectional voltage converter of claim 3 wherein when the bidirectional voltage converter operates in the second operation mode, the controller is further configured to turn on the second switch when the first current is a positive current, and to turn on the first switch when the first current is a negative current.

5. The bidirectional voltage converter of claim 3 further comprising:
   a second resonant circuit, coupled between the second bridge circuit and the transformer, wherein the second resonant circuit comprises:
      a second capacitor, coupled to the third connection node; and
      a second inductor, coupled in series to the second capacitor, and coupled to the first terminal of the second side of the transformer;
   a second current sensing circuit, sensing a second current flowing through the second resonant circuit.

6. The bidirectional voltage converter of claim 1, wherein the first switch includes a first transistor, the second switch includes a second transistor, the third switch includes a third transistor, the fourth switch includes a fourth transistor, the fifth switch includes a fifth transistor, the sixth switch includes a sixth transistor, the seventh switch includes a seventh transistor, and the eighth switch includes an eighth transistor.

7. A bidirectional voltage converter, comprising:
a transformer, comprising a first side and a second side;
a first bridge circuit, coupled to the first side of the transformer and coupled to a first voltage source, comprising a first switch, a second switch, a third switch and a fourth switch, wherein a first terminal of the first switch and a first terminal of the third switch are coupled to a first terminal of the first voltage source, a second terminal of the first switch is coupled to a first connection node, a first terminal of the second switch is coupled to the first connection node, a second terminal of the third switch is coupled to a second connection node, a first terminal of the fourth switch is coupled to the second connection node, a first terminal of the first side of the transformer is coupled to the first connection node, and a second terminal of the first side of the transformer is coupled to the second connection node, a second terminal of the second switch and a second terminal of the fourth switch are coupled to a second terminal of the first voltage source;
a second bridge circuit, coupled to the second side of the transformer and coupled to a second voltage source;
a controller, coupled to the first bridge circuit and the second bridge circuit;
a first resonant circuit, coupled between the first bridge circuit and the transformer, wherein the first resonant circuit comprises:
a first capacitor, coupled to the first connection node; and
a first inductor, coupled in series to the first capacitor, and coupled to the first terminal of the first side of the transformer; and
a first current sensing circuit, sensing a first current flowing through the first resonant circuit,
wherein the controller is configured to set the first bridge circuit to a half-bridge configuration by turning off the third switch, turning on the fourth switch, and alternately turning on and off the first switch and the second switch in response to determining that a voltage of the second voltage source is less than a predetermined threshold,
the second bridge circuit comprises a fifth switch, a sixth switch, a seventh switch and an eighth switch, wherein a first terminal of the fifth switch and a first terminal of the seventh switch are coupled to a first terminal of the second voltage source, a second terminal of the fifth switch is coupled to a third connection node, a first terminal of the sixth switch is coupled to the third connection node, a second terminal of the seventh switch is coupled to a fourth connection node, a first terminal of the eighth switch is coupled to the fourth connection node, a first terminal of the second side of the transformer is coupled to the third connection node, a second terminal of the second side of the transformer is coupled to the fourth connection node, a second terminal of the sixth switch and a second terminal of the eighth switch are coupled to a second terminal of the second voltage source,
the controller is further configured to set the second bridge circuit to the full-bridge configuration by alternately turning on and off the fifth switch, the sixth switch, the seventh switch and the eighth switch,
the controller is further configured to set the first bridge circuit to the full-bridge configuration in response to determining that the voltage of the second voltage source is greater than or equal to the predetermined threshold by alternately turning on and off the first switch, the second switch, the third switch and the fourth switch,
when the bidirectional voltage converter operates in a first operation mode, the first side of the transformer is a primary side of the transformer and the second side of the transformer is a secondary side of the transformer,
when the bidirectional voltage converter operates in a second operation mode, the first side of the transformer is the secondary side of the transformer and the second side of the transformer is the primary side of the transformer,
when the controller sets the first bridge circuit to the full-bridge configuration by alternately turning on and off the first switch, the second switch, the third switch and the fourth switch, the controller alternately turns on and off the first switch, the second switch, the third switch and the fourth switch according to the first current, and
when the controller sets the first bridge circuit to the half-bridge configuration by alternately turning on and off the first switch and the second switch, the controller alternately turns on and off the first switch and the second switch according to the first current.

* * * * *